United States Patent [19]
Hayes

[11] 3,873,915
[45] Mar. 25, 1975

[54] COMBINATION FLASHLIGHT AND ELECTRIC CIRCUIT TESTER

[76] Inventor: John C. Hayes, 8316 Lages Ln., Baltimore, Md. 21207

[22] Filed: Dec. 28, 1973

[21] Appl. No.: 429,385

[52] U.S. Cl. .................................................. 324/53
[51] Int. Cl. .................................................. G01r 31/02
[58] Field of Search ...................................... 324/53

[56] References Cited
UNITED STATES PATENTS

| | | | |
|---|---|---|---|
| 1,668,847 | 5/1928 | Hook | 324/53 |
| 1,852,190 | 4/1932 | Roe | 324/53 |
| 2,302,248 | 11/1942 | Olson | 324/53 |
| 2,899,638 | 8/1959 | Olson | 324/53 |
| 2,902,643 | 9/1959 | Pasquale | 324/53 |
| 3,711,768 | 1/1973 | Frazin | 324/53 |
| 3,775,677 | 11/1973 | Garrett et al. | 324/53 |

*Primary Examiner*—Gerard R. Strecker
*Attorney, Agent, or Firm*—J. Wesley Everett

[57] ABSTRACT

This invention relates to an improved combination circuit tester and portable electrical light comprising an elongated housing having one or more electric cells encased therein for supplying an electric current to an electric two-pole circuit, an electrically operated lamp mounted to one end of the elongated housing and connnected directly to one of the poles, and a pair of testing leads extending outwardly from the opposite end of the housing and connected to the other pole in series with the light.

1 Claim, 4 Drawing Figures

PATENTED MAR 25 1975 3,873,915

COMBINATION FLASHLIGHT AND ELECTRIC CIRCUIT TESTER

The invention relates in general to a combination electric testing device and an electrically operated light most frequently referred to as a "flash light". The device is primarily used for testing automobile electric circuits, but is not limited thereto and is broadly applicable to power plants of any size and many other types of services.

One object of the invention is to provide a simple electric circuit tester which may easily double as an electrically operated portable light.

Another object of the invention is to provide a structure in which the several parts may be readily interchangeable when they wear out or become defective.

Another object of the invention is to provide a structure wherein the test leads may be of such length as to not disturb its use as a flash light when not being used as a testing device.

A further object of the invention is to provide means wherein the outer portions of the leads are readily removed and the remaining ends of the leads connected to each other to close the electric circuit when the device is being used as a light.

While several objects have been pointed out above, other objects, uses and advantages will appear as the nature of the device is described in more detail in the specification and pointed out in the accompanying drawings in which.

In referring to the drawings, like numerals are used to describe like and similar parts throughout the several views.

Figure 1:
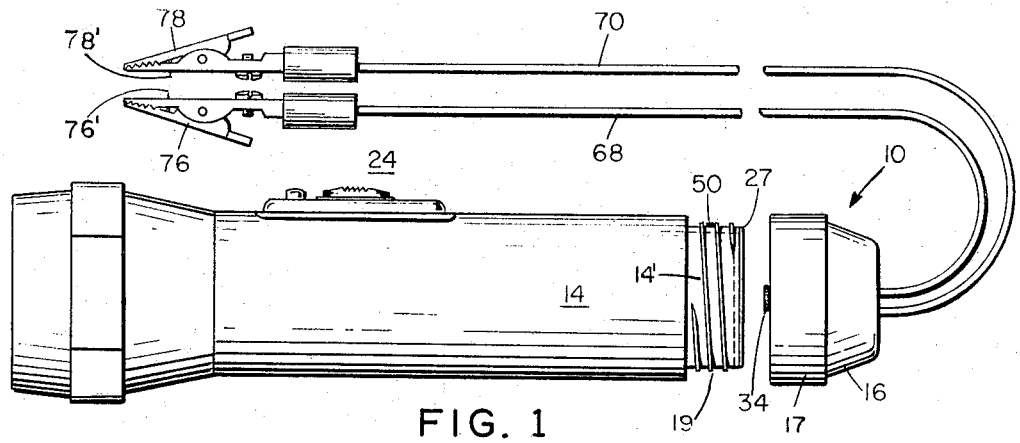
FIG. 1 is a view in elevation of the device having the end cap or cover opposite the light on the housing detached.

The device is provided with a tubular housing 14 for receiving and retaining the electric cells 30 and 32 which supply electric current to the light and test leads 68 and 70 (FIG. 1). Fixed to the housing is an electric switch 24 for making and breaking the electric circuit to the light 18. Positioned on the end 14' of the housing 14 is preferable a hollow detachable cap or cover 10, and leading from the cap 10 is a pair of test leads 68 and 70 (FIG. 1) A portion 17 of the cap is provided with its inner surface with suitable threads for engaging the screw threads 19 on the portion 14' of the housing. The outer end portion 16 of the cap member 10 is provided with openings 52 and 54 (see FIG. 4.) to allow the test leads 68 and 70 to enter the casing to be attached to suitable terminals in the electric circuit.

The test leads 68 and 70 are preferably provided with suitable clamps 76 and 78 having preferably spikes 76' and 78' to pierce the customary insulation on wire and other surfaces to be contacted to determine whether or not an electric current will pass between the two points as in the case of testing ignition systems and other electric circuits.

About the outer edge of the area 14' of the housing there is a metal ring 27 (see FIGS. 1 and 3) which is adapted to bear against a resilient member 28 to insure good electrical contact with the member 26 leading to the switch 24, all of which will be referred to later.

Figure 2:
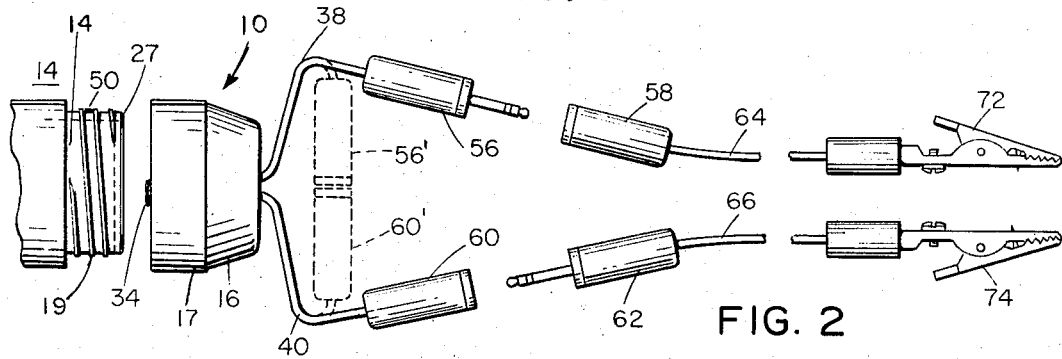
FIG. 2 is a fragmentary view in elevation of the device illustrating the manner in which the test leads are attached to the cap or end cover.

FIG. 2 illustrates a modified form of the device in which the device is provided with unusually long test leads 64 and 66 which may be disconnected from a pair of shorter leads 38 and 40 which extend only a short distance beyond the cap portion 16. The leads 64 and 66 are provided with separatable connectors which connectors are made up of two parts each 56 and 58 and 60 and 62. The leads 38 and 64, including the connector parts 56 and 58, are connected with a suitable clamp 72, and the leads 40 and 66, including the connectors 60 and 62, are connected with a suitable clamp 74. The short leads 38 and 40 may be disconnected from the leads 64 and 66 and connected to each other as shown in dotted lines at 56' and 60' to complete the circuit to the lamp when the switch 24 is operated. When the connector elements 56' and 60' are connected as shown by the dotted lines in FIG. 2, the device may be operated as a portable light.

Figure 3:
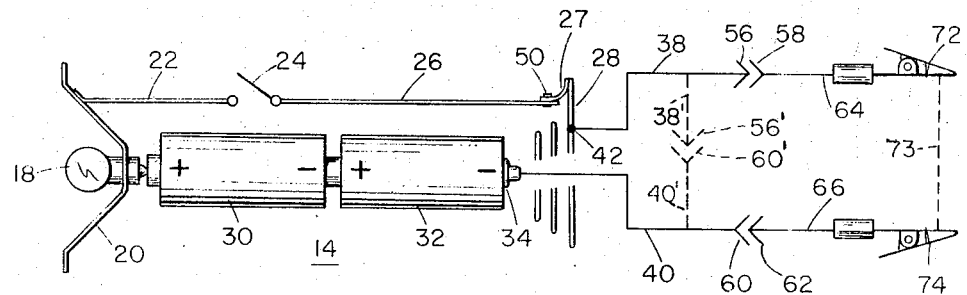
FIG. 3 is a circuit diagram showing the electric wiring of the device as a circuit tester and as an electric light or lamp.

FIG. 3 shows the wiring diagram in solid lines when the device is to be used as a tester, and in dotted lines when it is being used as a portable light.

Current is supplied by the batteries 30 and 32 to energize the electric circuit. When the device is being used as a tester, current will flow through the contact member 34, lead 40, separatable connectors 60-62, leads 66 to the clamp 74. The other side of the electric circuit will flow through the resilient support member 28, lead 38 which is connected to the member 28, separatable connectors 56-58, lead 64 to to the clamp 72. With this arrangement it is readily seen that when the testing leads 64 and 66 are connected as shown and described in FIG. 2 and the switch 24 is closed, if there is current passing between the clamps 72 and 74 as shown by the dotted lines 73, the light 18 will light. If there is no passage of electric current between clamps 72 and 74 then the light will not light. This, of course, will show the user whether or not the current is shorted out between clamps 72 and 74. It all depends on what tests are being made whether or not current should be passing between clamps 72 and 74.

Figure 4:
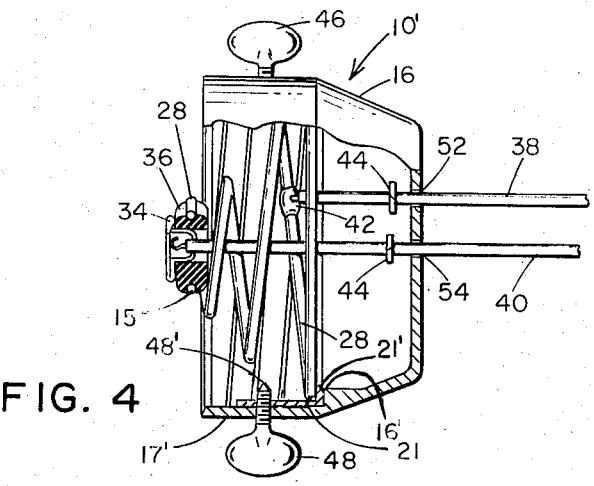
FIG. 4 is an enlarged view of a modified form of cap member partly in section and partly in elevation illustrating the manner in which the test leads are connected with the electric circuit.

The details of the electrical hookup with the battery circuit for both the caps 10 and 10', shown in FIGS. 1 and 2, are shown in FIG. 4. FIG. 4 shows a modified form of metal or plastic cap wherein the portion 17' of the cap is adapted to slidably telescope onto the end of the housing 14', that is, the cap is not held to the housing by the screw threads 19 as previously described for FIGS. 1 and 2. The portion 17', shown in FIG. 4, is provided with at least a pair of thumb screws 46 and 48 which are threaded through the cap portion 17' and an electric conducting element 21 is adapted to engage a rivet 50 embedded in the area 14' of the member 14 which in turn is connected to the member 28 (see FIG. 3, previously described). The inner end 48' of the thumb screw 48 is adapted to engage the rivet 50 for insuring good electrical contact with the member 21 which in turn is in electrical contact with the coil spring member 28.

The outer end of the coil spring or resilient member 28 is fixedly supported on the portion 21' of the element 21 which in turn is supported upon a lip 16' formed in the cap. The inner end of the spring member 28 supports an insulated member 36 which in turn supports the contact member 34. The insulated material 36 is shown held by one of the spring coils; however, it may be supported on the spring in any convenient manner.

In order to prevent the leads 38 and 40 from being pulled from the cap there are provided shoulders 44 secured to the leads 38 and 40 shown in FIG. 4.

The device is shown with interchangeable caps 10 or 10'; however, the body portion of the housing may also be constructed with the cap portion formed integrally with the remaining housing in which the electrical contact member and the wiring circuit are positioned, as shown in FIGS. 3 and 4, and are arranged in the closed end of the housing by passing the elements through the remaining removal end which is at the lamp end of the housing. It will be noted that the lead 38 is connected to the resilient member 28 at 42 and lead 40 is connected to the terminal 34.

While the device has been described and illustrated in a particular form, it is not intended as a limitation as the scope of the invention is best defined by the appended claims.

I claim:

1. A combination electrical circuit tester and portable lamp comprising:
  a. a hollow housing having a light bulb attached within a light reflector fixedly secured at one end of the housing and an attachable cap secured to the opposite end of the housing;
  b. said housing being of suitable size and adapted to encase at least one electric producing dry cell including a positive pole at one end which contacts the light bulb, and a negative pole at the opposite end positioned toward the opposite end of the housing;
  c. a resilient spring member positioned between the cap and the nagative pole of the dry cell;
  d. a pair of electric conductor wires extending outwardly through an opening in the cap member wherein one end of one of the wires extending through the cap is connected to an electric terminal element adapted to engage the negative pole of the dry cell, means for supporting the terminal element on an electric non-conducting member said member positioned on the inner end of the resilient spring member and insulating the terminal element from said spring member, the inner end of the resilient spring member being formed to encircle the non-conducting member for fixedly securing the non-conducting member to the inner end of the resilient spring member;
  e. the other extended electric conductor wire extending through the cap being fixed directly to the resilient spring member;
  f. means connecting the said resilient spring member to the positive end of the dry cell;
  g. separate means associated with each of the electric conductor wires positioned immediately outside the cap and adjacent thereto for disengaging at said position each of said electric conductor wires from the housing, said disengaging means adapted to engage each other for completing the electric circuit to the light bulb;
  h. clamp means attached to the outer end of the electric conductor wires for clamping the wires to elements through which the electric current from the dry cell will pass when the passage of electric current between the elements is uninterrupted.

* * * * *